J. J. FRANK.
ALUMINUM CELL REACTANCE.
APPLICATION FILED FEB. 2, 1909.
941,445.
Patented Nov. 30, 1909.
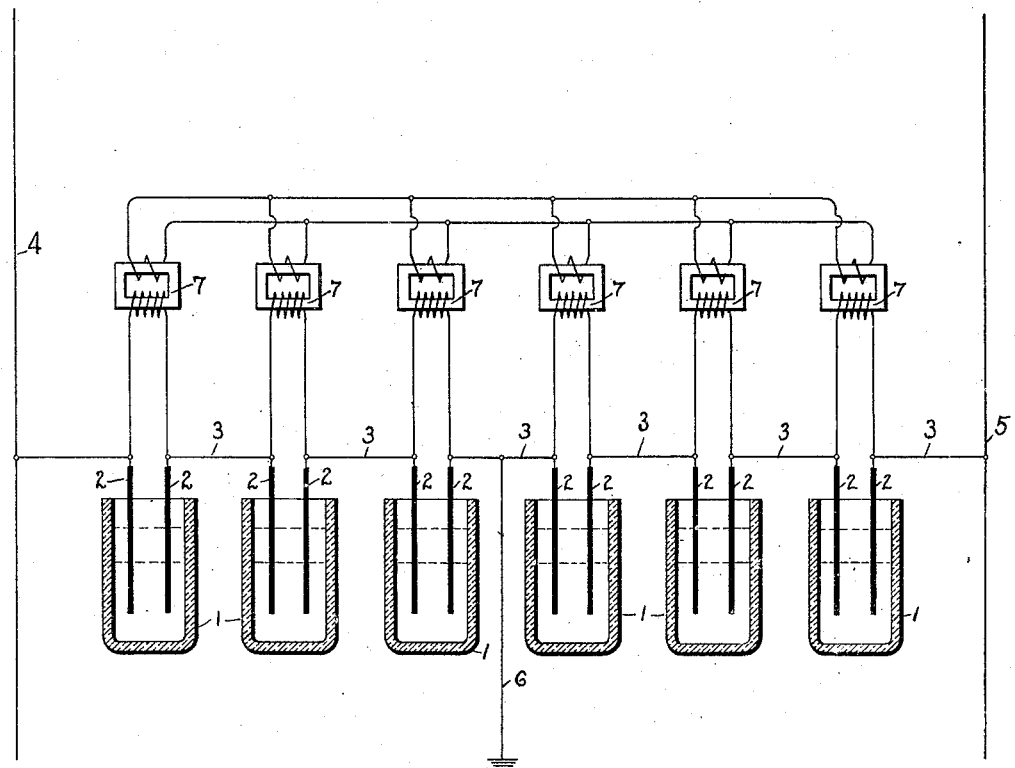
Witnesses:
Inventor:
John J. Frank,
by
Atty.

UNITED STATES PATENT OFFICE.

JOHN J. FRANK, OF PITTSFIELD, MASSACHUSETTS, ASSIGNOR TO GENERAL ELECTRIC COMPANY, A CORPORATION OF NEW YORK.

ALUMINUM CELL REACTANCE.

941,445.         Specification of Letters Patent.     Patented Nov. 30, 1909.

Application filed February 2, 1909. Serial No. 475,580.

*To all whom it may concern:*

Be it known that I, JOHN J. FRANK, a citizen of the United States, residing at Pittsfield, county of Berkshire, State of Massachusetts, have invented certain new and useful Improvements in Aluminum Cell Reactances, of which the following is a specification.

My invention relates to the use of a plurality of electrolytic condenser cells which are connected in series across the lines of a transmission system for the purpose of protecting the line from lightning, and equalizing surges and other disturbances in said lines.

The electrolytic condenser is now well understood in the art and, therefore, only a brief description of the same is here required. It consists essentially of aluminum electrodes immersed in a suitable electrolyte. When a cell of this kind is included in an electric circuit a thin film of aluminum oxid or hydroxid forms on each plate, which chokes back almost completely the flow of current. When connected to an alternating current circuit, the cell has a condenser action. The resistance of the film is limited to a certain "critical voltage". If this is exceeded its resistance is broken down, and current of a potential in excess of this breakdown voltage flows freely through the cell. The critical, or breakdown, voltage of the film is dependent upon the character of the electrolyte, the voltage impressed on the cell, and other factors. It has been found that when a plurality of such cells are connected in series the critical voltage will not be the same for each cell. It sometimes happens that the film of one or more cells of such a series will deteriorate to an extent so as to cease to take their share of the impressed voltage and will thereby throw an excessive strain on the remaining cells. The overloading of the remaining cells may result in undue heating of one or more of these cells, leading to a further breakdown, until the effectiveness of the device as a surge protector or lightning arrester is destroyed.

According to my invention, I connect the primary coil of a small transformer across the terminals of each one of the condenser cells of the series. The secondary coils of all of the transformers are connected in multiple. With an arrangement of this kind when one of the cells becomes unbalanced and will no longer do its share of the work, the drop in voltage across its terminals is uniformly distributed among the remaining cells.

If the film on one of the cells has for any reason become deteriorated, instead of an excessive strain being thrown on one of the other cells in which the film is in better condition than the rest, the transformer across the terminals of the cell with the good film receives the energy, and the voltage is distributed uniformly among all of the remaining cells. An increased current is furnished by the transformer connected across the unbalanced cell, tending to repair its film and restore it to its normal condition.

The accompanying drawing is a diagram, illustrating my invention.

The cells consist of glass jars 1 partly filled with electrolyte, above which I prefer to place a layer of oil to prevent evaporation. The electrodes 2 are aluminum plates. The cells are connected in series by conductors 3, the end plates of the series being connected to lines 4, 5. The middle point of the series is grounded by conductor 6. Across the electrode of each cell is connected a transformer 7, in this case a step-down transformer, the primary coil being connected across the electrodes 2. The secondary coils of the transformers are all connected in multiple. The size of the transformers and the ratio of transformation, of course, may be varied within wide limits. As a matter of illustration, I will state that with a transformer having its primary windings designed for about 220 volts the secondary winding may be conveniently proportioned to furnish about five or ten volts.

Another advantage of using an individual transformer for each cell is that the cell with its transformer constitutes a unit which may be connected to any number of cells already in use. The wires connecting the transformers across the cells may be short, making the whole arrangement more compact than with the compensator connections.

What I claim as new and desire to secure by Letters Patent of the United States, is:—

1. The combination of a plurality of aluminum condenser cells, an inductive coil connected across each of said cells, separate coils each in inductive relation with one of said coils, and a common electrical circuit for the latter set of separate coils.

2. The combination of a plurality of aluminum condenser cells connected in series, and a plurality of transformers each having one winding connected across one of said cells and another winding connected in multiple with a winding of each of the other transformers.

3. The combination of aluminum condenser cells, a transformer for each of said cells, having a primary winding connected across the electrodes of its corresponding cell, a secondary winding for each of said transformers, and a common multiple connection for all of the secondary windings.

In witness whereof, I have hereunto set my hand this 30th day of January, 1909.

JOHN J. FRANK.

Witnesses:
P. A. SMITH,
F. G. LORAMER.